United States Patent [19]
Jaccod

[11] Patent Number: 4,624,651
[45] Date of Patent: Nov. 25, 1986

[54] VARIABLE SPEED DRIVE PULLEY

[75] Inventor: Michel Jaccod, Champigny sur Marne, France

[73] Assignee: Valeo, Paris, France

[21] Appl. No.: 661,466

[22] Filed: Oct. 16, 1984

[30] Foreign Application Priority Data

Oct. 21, 1983 [FR] France .............................. 83 16760

[51] Int. Cl.⁴ ..................... F16H 55/56; F16H 11/06
[52] U.S. Cl. ......................................... 474/13; 474/46
[58] Field of Search ............................... 474/13, 46, 8

[56] References Cited

U.S. PATENT DOCUMENTS

| 2,973,655 | 3/1961 | Rix ........................................ 474/46 |
| 3,269,201 | 8/1966 | Looker ................................ 474/8 X |
| 3,962,927 | 6/1976 | Beaudoin ........................ 474/46 X |
| 4,078,442 | 3/1978 | Bendall ............................ 474/46 X |
| 4,132,120 | 1/1979 | Fénart ................................. 474/13 |
| 4,364,735 | 12/1982 | Plamper ............................ 474/13 |
| 4,410,312 | 10/1983 | de Briel ............................. 474/13 |

FOREIGN PATENT DOCUMENTS 2347578 11/1977 France .
2365733 4/1978 France .
2516622 5/1983 France .

Primary Examiner—Stuart S. Levy
Assistant Examiner—Katherine Matecki
Attorney, Agent, or Firm—Charles E. Brown; Charles A. Brown

[57] ABSTRACT

The invention concerns variable speed drive pulleys comprising a hub and two annular flanges around the hub in axial face-to-face relationship to one another. At least one flange, the mobile flange, is movable relative to the hub in the axial direction. Elastic control means responsive to centrifugal force operate on the mobile flange so as to reduce the distance between the flanges when their rotation speed increases. A bearing surface on one flange and an elastic bearing member on the other, in axial face-to-face relationship to one another, are adapted by virtue of their mutual abutment to limit elastically the reduction in the axial distance between the flanges for increasing rotation speeds.

19 Claims, 15 Drawing Figures

VARIABLE SPEED DRIVE PULLEY

BACKGROUND OF THE INVENTION

1. Field of the Invention

The present invention is generally concerned with variable speed drives of the type employed for the controlled driving of any type of member from any type of motor and, in an automobile vehicle, for example, to drive any auxiliary member of the latter, such as an alternator, water pump, compressor or fan as usually fitted to the vehicle, from the motor of the latter.

The invention is more precisely concerned with variable speed drive pulleys of the kind comprising a hub, two annular flanges around the hub in axial face-to-face relationship to one another, at least one of which, hereinafter referred to as the mobile flange, is movable relative to the hub in the axial direction, and elastic control means responsive to centrifugal force and operative on the mobile flange so as to reduce the distance between the flanges when their rotation speed increases.

2. Description of the Prior Art

Pulleys of this kind are described in particular in French Pat. No. 2 347 578 filed Apr. 9, 1976 under registration number 76 10392, and in French Patent Application No. 81 21590 filed Dec. 18, 1981.

These documents describe variable speed drives comprising a driving pulley and a driven pulley rotationally coupled by an endless belt. These variable speed drives are intended in particular to drive auxiliary equipment of an automotive vehicle, providing for a drive ratio which tends to decrease when the rotation speed of their driving pulley increases. To this end this driving pulley comprises, around a hub, two frustoconical annual flanges of which one at least is movable axially and which are adapted to move apart when their speed increases. The complementary driven pulley comprises, around a hub, two frustoconical annular flanges one at least of which is mobile axially and which are adapted to move closer together when their speed increases. In this type of variable speed drive it is the driven pulley to which the invention is of particular relevance.

It should be noted that in the aforementioned patents control means tending to move the two flanges closer together or further apart, as appropriate, are formed by a frustoconical diaphragm spring comprising radial fingers to which are attached flyweights responsive to centrifugal force.

Thus, as is known, in a device of this kind the curve representing variations in the speed of the driven pulley as a function of motor speed comprises a first portion in which the speed increases, a second portion in which the centrifugal action of the flyweights causes the transmission ratio to be reduced and a third portion in which the variable speed drive ceases to act and the transmission ratio remains constant.

In practice the second portion corresponds to a substantially constant speed of the driven pulley, independent of the speed of the driving shaft. This substantially constant (or at least only slightly varying) speed of the driven pulley is generally employed to drive auxiliary equipment at the optimum speed, for a broad range of instantaneous speeds of the driving pulley. By way of example, in the case of an internal combustion engined automobile vehicle the variable speed drives conventionally employed are adapted to maintain the speed of the driven pulley at around 1,500 rpm, whereas the speed of the driving pulley fluctuates between 1,000 and 2,500 rpm.

The present invention is specifically concerned with the transition between the second and third portions of the aforementioned curve, representing relative variations in the speeds of the driving and driven pulleys. This transition corresponds to the moment at which the flanges of the driving pulley reach their configuration of maximum separation and at which the flanges of the driven pulley reach their configuration of minimum separation.

In practice, one of the problems raised by designing variable speed drive pulleys resides in the geometrical design of the extreme configurations of the various pulleys, taking into account notably the fact that the extreme configurations of the driving and driven pulleys of the same variable speed drive must be compatible, which means that they must produce a tension in the belt linking the pulleys which is sufficiently high to ensure good adhesion between the belt and flanges and thus proper transmission of torque, but sufficiently low to ensure a long service life of the belt. The belt tension must be maintained within relatively closely spaced limits.

In currently known variable speed drives the extreme configurations of the pulleys at high speeds result from a compromise between the forces exerted on the mobile flange by the belt by virtue of its tension, on the one hand, and by the diaphragm spring which urges the flange towards an idle configuration, on the other hand, this latter force being tempered by the action of the flyweights. Because the tension in the belt is taken into account, the compatibility condition previously mentioned is achieved.

It is sometimes advantageous to use a "working point" in the third portion of the curve, at increasingly higher speeds.

At these higher speeds the flanges of a driven pulley tend, because of the action of the centrifugal flyweights, to move closer and closer together and therefore to move the associated transmission belt further and further outwards in the radial direction, resulting in excessive tension in the belt prejudicial to its service life.

An object of the present invention is to limit the centrifugal effects on the belt around a pulley of the aforementioned type at high speeds without cancelling the centrifugal effect, which would be prejudicial to correct operation of the variable speed drive.

Thus precise control and appropriate behavior of a variable speed drive pulley are achieved at the end of the movement towards one another of its flanges under the effects of centrifugal force.

SUMMARY OF THE INVENTION

The present invention consists in a variable speed drive pulley comprising a hub, two annular flanges around the hub in axial face-to-face relationship to one another, at least one of which, hereinafter referred to as the mobile flange, is movable relative to the hub in the axial direction, elastic control means responsive to centrifugal force and operative on the mobile flange so as to reduce the distance between the flanges when their rotation speed increases, and a bearing surface and an elastic bearing member associated with respective flanges in axial face-to-face relationship and adapted, by virtue of their mutual abutment, to limit elastically the reduction in the axial distance between the flanges for increasing rotation speeds.

An arrangement of this kind might be thought similar to that proposed in French Pat. No. 2 365 733 based on U.S. patent application Ser. No. 727,058, now U.S. Pat. No. 4,075,902. The similarity is merely superficial, however, in that this prior art document describes a pulley formed by two mobile flanges mounted on a hub: an annular spring or an O-ring is fitted into an annular groove in the hub so as to separate the respective areas in which the flanges move, the flanges coming into contact with this O-ring through soft pads. There is no bearing surface and no elastic bearing member, associated with respective flanges and adapted, in accordance with the invention, to cooperate with one another by virtue of mutual abutment.

Another object of the invention is to procure continuity between the second and third portions of a characteristic curve of a variable speed drive of the aforementioned type.

In one embodiment the bearing member is disposed against a transverse shoulder which forms part of the hub and advantageously features stages of successively increasing stiffness. In this way it is possible to obtain good continuity between the second and third portions of the characteristic curve of a variable speed drive of the aforementioned type. The invention thus makes it possible to modify as required the regulation curves.

In a preferred embodiment the elastic bearing member is a Belleville spring, the inherent elastic properties of which are employed to obtain stages of successively different stiffness.

In another preferred embodiment the bearing member is of an elastomer material and may advantageously comprise openings and axial and/or radial projections.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

A variable speed drive to which the invention is applied comprises, in the usual manner, a driving pulley, a driven pulley and an endless belt passing around the pulleys.

Figure 1:
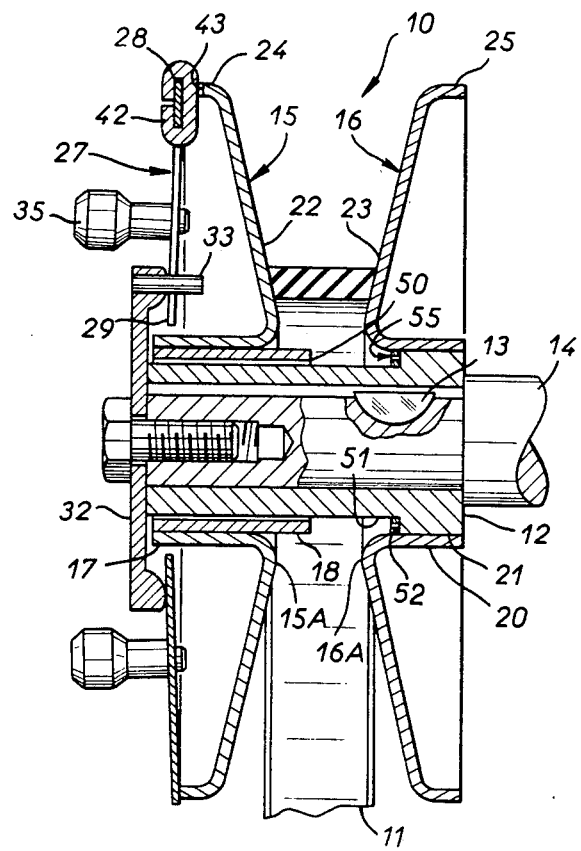
FIG. 1 is a view in axial cross-section of a variable speed drive pulley in accordance with the invention.

As shown in FIG. 1, a driven pulley 10 comprises a hub 12 or pulley shaft which, for example and as shown here, is keyed to a drive shaft 14 by a key 13 so as to rotate with it, and two annular flanges 15 and 16 around the hub 12 in face-to-face relationship, here of complementary frustoconical shape, and at least one of which, the flange 15 in the embodiment shown, hereinafter referred to as the mobile flange, is movable axially relative to the hub 12.

In the embodiment shown the mobile flange 15 has for this purpose, in its central part, an axial collar 17 by means of which it is attached to a bush 18 and, through the intermediary of the latter, slidably engaged with clearance on the hub 12.

In this embodiment the other flange 16, hereinafter referred to as the fixed flange, is locked to the hub 12 axially and in rotation, that is to say circumferentially, and to this end is attached by an axial collar 20 to a bearing surface 21 on the hub 12.

The flanges 15 and 16 have frustoconical flanks 22 and 23 facing one another, of respectively opposite slopes, the belt 11 having a trapezoidal cross-section.

The flanges 15 and 16 have oppositely directed axial rims 24 and 25 at their perimeters.

In a manner which is known per se, the mobile flange 15 is operated on by elastic return means which continuously urge it towards the fixed flange 16. These elastic return means consist of an annular member 27, hereinafter referred to as the diaphragm spring, comprising on the one hand a peripheral part 28 forming a Belleville spring which bears axially on the mobile flange 15 and, on the other hand, a central part divided by slots into radial fingers 29 which bear axially against a member 32, hereinafter referred to as the bearing member, which is locked axially and in rotation, that is to say circumferentially, to the hub 12.

In the embodiment shown, the diaphragm spring 27 carries on its radial fingers 29 flyweights 35 which, as this is a driven pulley, project from the side of the diaphragm spring 27 which is opposite the mobile flange 15.

In the embodiment shown, the bearing member 32 is attached to the hub 12 by crimping and, to provide for the driving in rotation of the diaphragm spring 27, it has, from place to place, axially projecting pins 33 individually inserted into respective slots in the diaphragm spring.

As shown here, the diaphragm spring 27 of the driven pulley 10 has its peripheral part forming the Belleville spring 28 in direct axial bearing engagement with the axial rim 24 of the mobile flange 15; to provide for the rotational driving of the mobile flange 15 by the diaphragm spring 27, the peripheral part forming the Belleville spring 28 carries, from place to place, blocks 42 engaged in respective notches 43 provided for this purpose in the axial rim 24 of the mobile flange 15.

In an alternative embodiment which is not shown, the driving of the mobile flange 15 in rotation is obtained independently of the diaphragm spring 27, by means of a longitudinally splined coupling between the flange 15 and the hub 12, for example.

As is known the driven pulley 10 shown by way of example in FIG. 1 cooperates with a driving pulley (not shown) of substantially similar structure to the driven pulley, except that it comprises flyweights which project from the side of the diaphragm spring facing the mobile flange.

These arrangements are well known per se, in particular through French Pat. No. 2 347 578 mentioned hereinabove, and as they do not form part of the present invention they will not be described in more detail here.

As is known, in a variable speed drive of this kind, in the idle configuration, the conditions are such that the mobile flange of the driving pulley occupies an advanced position close to the associated fixed flange, such that the belt occupies an idle configuration in which it extends around the peripheral part of the driving pulley and the central part of the driven pulley 10, the mobile flange 15 of the driven pulley 10 being drawn away from the associated fixed flange 16 (see FIG. 1).

Thus in service the transmission ratio is initially maximal.

Then, above a certain speed and under the effect of centrifugal force, the mobile flange of the driving pulley is drawn back relative to the associated fixed flange, so that the belt 11 then of its own accord moves to a configuration in which it extends around the central part of the driving pulley and the peripheral part of the driven pulley 10, the mobile flange 15 of the driven pulley 10 occupying an advanced position relative to the associated fixed flange 16.

The transmission ratio is then minimal.

In accordance with the invention, the pulley 10 shown by way of example in FIG. 1 comprises, on respective flanges and in axial face-to-face relationship to one another, a bearing surface 50, in this instance constituted by part of the edge of the bush 18 by virtue of which the mobile flange slides along the hub 12, and an elastic bearing member 55, in this instance attached to the fixed flange 16. The relative movement towards one another of the two flanges is thus elastically limited.

It should be noted that limiting this movement by means of rigid abutment members would not provide for maintaining the axial force on the belt approproate to correct transmission and that any overloads would be entirely absorbed by the belt in the event that such abutment did not occur. The present invention therefore makes it possible to reconcile two apparently contradictory conditions, namely that for proper transmission and that for limiting the axial force on the belt in the position in which the two flanges are brought close together.

As shown in FIG. 1, the elastic bearing member is preferably disposed in an annular recess which is open in the axial direction, in which it is retained in the radial direction by the axial collar 20 of the fixed flange and by a cylindrical surface 51 on the hub, and in which it bears axially against a transverse shoulder 52 on the hub 12. This arrangement facilitates changing the belt of the variable speed drive in that space is provided in the radial direction inboard of the root portions of the flanges.

It should be noted that a recess of this kind normally exists in prior art variable speed drive pulleys. Thus no additional machining operation is required in applying the invention to already existing pulleys, provided that the manufacturing tolerances of the aforementioned recess are compatible with those of the bearing member to be inserted into it.

In an alternative embodiment which is not shown, the bearing surface and the elastic bearing member provided in accordance with the invention are further from the axis in the radial direction than in FIG. 1, in line with the root portions 15A and 16A of the two flanges of the pulley. This does not involve any further machining of prior art pulleys and calls only for the attachment of an appropriate elastic bearing member, in the vicinity of the root portion of the flange 15A, for example.

Figure 2:
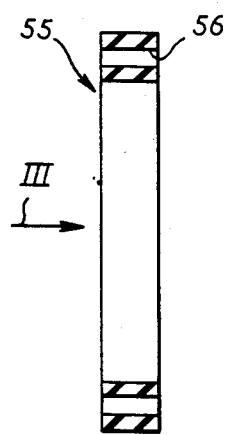
FIG. 2 is a view in axial cross-section and to a larger scale of the elastic bearing member which the pulley of FIG. 1 comprises.
Figure 3:
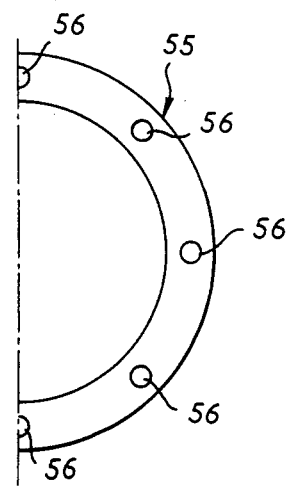
FIG. 3 is a half-view from the front of the elastic bearing member of FIG. 2.

The elastic bearing member 55 from FIG. 1 is shown to a larger scale in FIGS. 2 and 3.

This elastic bearing member is advantageously of an elastomer material. In the example shown it is of toroidal shape with generally rectangular cross-section.

In accordance with an advantageous feature of the invention the elastic bearing member 55 comprises axial openings 56, preferably equi-angularly distributed.

In the example shown in FIG. 3, the openings 56 are of circular cross-section.

By virtue of the presence of these openings 56, the elastic bearing member 55 constitutes a spring comprising two stages of different stiffness. On axial abutment of a bearing surface against the bearing member 55, the material from which this member is made tends to flow so as to close off the openings 56. At the end of this compacting of the elastic bearing member 55, any further load applied via the bearing surface is opposed by a suddenly increased stiffness. Thus the elastic bearing member 55 reacts with different stiffness according to whether or not the openings 56 are closed off or not.

Figure 4:
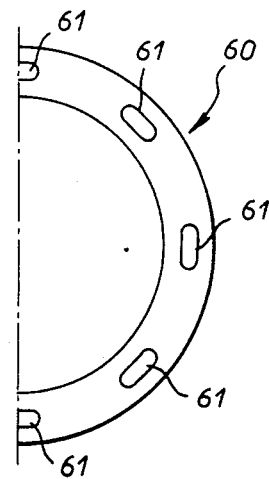
FIG. 4 is a half-view from the front of an elastic bearing member which is a variant of that of FIG. 3.

FIG. 4 shows an elastic bearing member 60 analogous to that of FIGS. 1 to 3, except that it comprises axial openings 61 which are no longer circular but rather elongated along a common cylindrical surface. It will be readily understood that the various stiffnesses of the elastic bearing member may be altered by adjusting the number, shape and size of these openings.

FIGS. 5 to 8 show embodiments of an elastic bearing member in accordance with the invention which may be used in a pulley of the type shown in FIG. 1. These members are preferably of an elastomer material and feature variations in their axial dimensions.

Figures 5, 6:
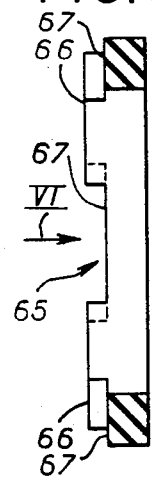
FIG. 5 is a view in axial cross-section of a further elastic bearing member.
FIG. 6 is a half-view from the front of the elastic bearing member of FIG. 5.

FIGS. 5 and 6 show an elastic bearing member 65 in the form of a ring of rectangular cross-section. This ring is divided into two alternating series of sectors 66 and 67 having different axial dimensions, resulting in a castellated appearance. This member constitutes a spring with two stages of different thickness to the extent that its sectors 66 which are longer in the axial direction initially resist on their own the thrust from a drive surface until, in a second stage, all the sectors 66 and 67 become loaded conjointly.

Figures 7, 8:
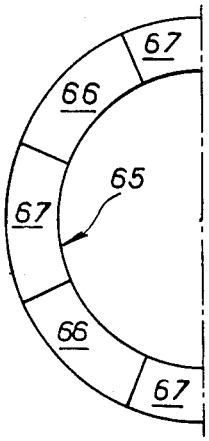
FIG. 7 is a view in axial cross-section of a bearing member constituting a variant of that of FIG. 6.
FIG. 8 is a half-view from the front of the bearing member of FIG. 7.

FIGS. 7 and 8 show an elastic bearing member 70 of analogous design ot the aforementioned member 65, except that this member 70 is in the form of a ring of circular cross-section. More precisely, the elastic bearing member 70 is divided into two alternating series of sectors 71 and 72 corresponding to part annular sections of either circular cross-section or of circular cross-section truncated perpendicular to the axis.

It should be noted that, disposed in a rectangular recess of the type in particular of that in which is disposed the elastic bearing member 55 of FIG. 1, the bearing member 70 of FIGS. 7 and 8 constitutes a spring comprising two stages the stiffness of which varies with the radial dimension of the surfaces through which the member 70 abuts the associated bearing surface, on the one hand, and the transverse supporting shoulder, on the other hand. It is therefore a spring with two stages of different and variable stiffness.

In an embodiment which is not shown, the axial dimension of the elastic bearing member varies continuously from one end to the other. The same may apply in the radial direction.

In another embodiment also not shown the elastic bearing member is delimited axially by surfaces inclined relative to the axis.

FIGS. 9 to 13 show elastic bearing members featuring stages of different thickness by virtue of the presence of axial projections.

Figure 9:
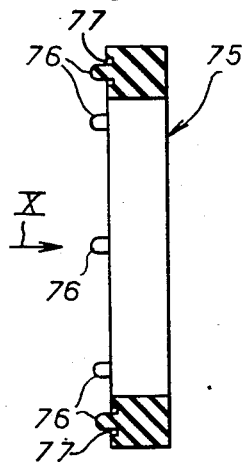
FIG. 9 is a view in axial cross-section of a further elastic member.
Figure 10:
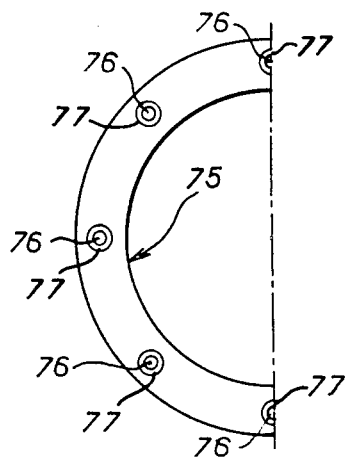
FIG. 10 is a half-view from the front of the elastic bearing member of FIG. 9.

FIGS. 9 and 10 show an elastic bearing member 75 with axial projections 76 intended to constitute, when crushed, a stage of low stiffness. In the example shown the member 75 is of generally rectangular cross-section.

The axial projections are advantageously surrounded at their root portion by annular grooves 77 adapted to be closed off when they are crushed.

Figure 12:
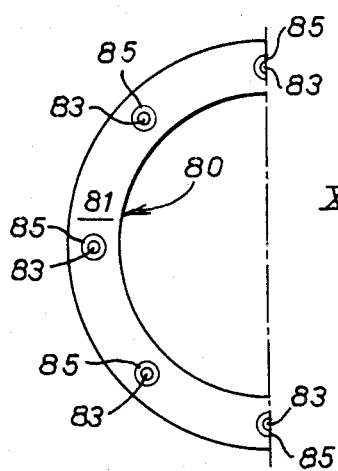
FIG. 12 is a half-view of the bearing member of FIG. 11 in the direction of the arrow XIII.
Figure 11:
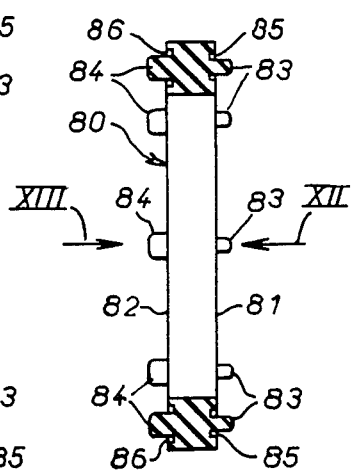
FIG. 11 is a view in axial cross-section of an elastic bearing member which constitutes a variant of that of FIG. 9.
Figure 13:
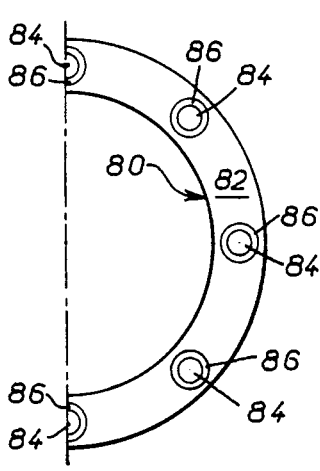
FIG. 13 is a half-view of the bearing member of FIG. 11 in the direction of the arrow XIII.

FIGS. 11 to 13 show an elastic bearing member 80 formed by a ring of rectangular cross-section, comprising an opposite transverse surfaces 81 and 82 two series of axial projections 83 and 84 of different sizes, and thus of different elastic characteristics, advantageously surrounded at their root portion by circular grooves 85 and 86. An elastic bearing member 80 of this kind constitutes a three-stage spring with three different degrees of stiffness.

In another embodiment which is not shown an elastic bearing member in accordance with the invention comprises, on at least one of its transverse surfaces, a plurality of different axial projections.

Figure 14:
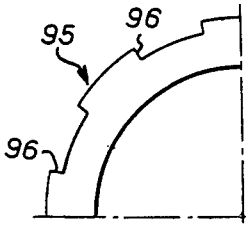
FIG. 14 is a detail view relating to another variation on the bearing member.

In the FIG. 14 embodiment, the elastic bearing member 95 has radial projections 96 adapted to constitute, when crushed, a stage of low stiffness. In practice there projections are designed to cooperate with the axial collar 20. Thus during a first phase the spaces between the projections are filled in and in a second phase any further force applied by the bearing surface is opposed by a sharply increased stiffness. In a similar way to the embodiment of FIGS. 11 to 13, the elastic bearing member may naturally have on its two axial surfaces two series of radial projections of different size.

In practice, by appropriately choosing the elastic material used, the geometry, the arrangement of the projections and/or openings, and their number and shape, the man skilled in the art will be able to obtain the various degrees of stiffness required. Where necessary, it is possible to implement a highly progressive transition between two consecutive portions of the charcteristic curve of the variable speed drive used.

Likewise the man skilled in the art can choose between the various bearing members as appropriate to the operating conditions of a particular variable speed drive. The elastic bearing members may be deformed by compression, as hereinabove, or by bending (metal members).

Figure 15:
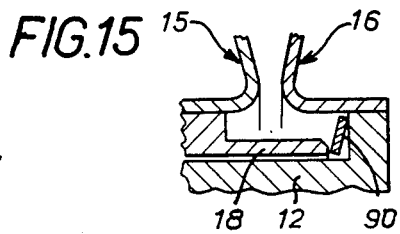
FIG. 15 is a view in axial cross-section of a detail of a variable speed drive pulley in an embodiment using a Belleville spring.

FIG. 15 shows an elastic bearing member which is of metal. It is a frustoconical annular spring of the Belleville spring type, the inherent characteristics of which are exploited to obtain variable stiffness.

It will be understood that various changes in the details, materials and arrangements of parts which have been herein described and illustrated in order to explain the nature of the invention may be made by those skilled in the art within the principle and scope of the invention as expressed in the appended claims. For example, the elastic member 55 may be fitted with clearance relative to the axial collar 20.

It should be noted in particular that the bearing surface and the bearing member may be associated with either flange, at will, and that their abutment surfaces are not necessarily transverse or radially plane.

It should also be noted that the axial bearing of the diaphragm spring 27 against the axial rim 24 of the mobiel flange may be obtained through the intermediary of an elastic material spacer attached axially and circumferentially to the peripheral part forming the Belleville spring and attached at least in the axial direction to the mobile flange, as described in the aforementioned French Patent Application No 81 2590.

I claim:

1. A variable speed drive pulley comprising a hub having an axis, two annular flanges disposed around said hub in axial face-to-face relationship, at least one of said flanges being a mobile flange axially movable between a retracted position in which said mobile flange is relatively remote from said other flange and an advanced position in which said mobile flange is relatively close to said other flange, elastic control means responsive to centrifugal force for moving said mobile flange towards said other flange, a transmission belt received between said flanges and movable radially in accordance with the axial position of said mobile flange, a bearing surface and an elastic bearing member fixed relative to respective ones of said flanges the bearing surface and the bearing member being located remote from each other when said mobile flange is in said retracted position, and the bearing surface and the bearing member being arranged to come into engagement with each other when said mobile flange reaches said advanced position for exerting an elastic force opposing the movement of said mobile flange toward said other flange.

2. Pulley according to claim 1, wherein said bearing surface is rigidly fixed relative to said mobile flange and said elastic bearing member is mounted against a shoulder rigidly fixed relative to the hub.

3. Pulley according to claim 2, further comprising a bush slidably mounted on said hub, said mobile flange being mounted for sliding movement on said bush, said bush being received in an axial recess formed in an outer surface of said hub, said bearing surface being defined by at least a portion of a leading edge of said bush, said elastic bearing member being arranged and retained at an axial end of said recess remote from said bush.

4. Pulley according to claim 1 wherein said elastic bearing member is of a structural arrangement wherein the stiffness of said elastic bearing member is conditioned by the degree to which it is deformed.

5. Pulley according to claim 4, wherein said elastic bearing member is a frustoconical annular member of the Belleville spring type.

6. Pulley according to claim 4, wherein said elastic bearing member is formed of an elastomer material.

7. Pulley according to claim 6, wherein said elastic bearing member is in the form of a ring of generally rectangular cross-section.

8. Pulley according to claim 6, wherein said elastic bearing member is in the form of a ring of generally circular cross-section.

9. Pulley according to claim 6, wherein said structural arrangement of said elastic bearing member provides for at least two stages of different stiffness.

10. Pulley according to claim 6, wherein said elastic bearing member features axial openings.

11. Pulley according to claim 6, wherein said elastic bearing member features variations in its axial dimensions.

12. Pulley according to claim 11, wherein said elastic bearing member is a ring formed by two alternating series of sections with different axial dimensions.

13. Pulley according to claim 11, wherein said elastic bearing member features annular sections of reduced axial dimensions.

14. Pulley according to claim 6, wherein said elastic bearing member features axial projections.

15. Pulley according to claim 6, wherein said elastic bearing member features radial projections.

16. Pulley according to claim 14, wherein said elastic bearing member features annular grooves around root portions of said projections.

17. Pulley according to claim 6, wherein said structural arrangement of said elastic bearing member provides for three stages of different stiffness.

18. Pulley according to claim 14, wherein said projections constitute series of projections of different sizes.

19. Pulley according to claim 14, wherein said elastic bearing member comprises oppositely directed projections.

* * * * *